(12) United States Patent
Batarseh

(10) Patent No.: US 12,228,002 B1
(45) Date of Patent: Feb. 18, 2025

(54) LASER CLADDING DOWNHOLE REPAIR

(71) Applicant: Saudi Arabian Oil Company, Dhahran (SA)

(72) Inventor: Sameeh Issa Batarseh, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/467,456

(22) Filed: Sep. 14, 2023

(51) Int. Cl.
*E21B 29/10* (2006.01)

(52) U.S. Cl.
CPC ................... *E21B 29/10* (2013.01)

(58) Field of Classification Search
CPC ........................................ E21B 29/10
USPC ..................................... 166/85.5
See application file for complete search history.

(56) References Cited

U.S. PATENT DOCUMENTS

| | | | |
|---|---|---|---|
| 6,755,262 B2 | 6/2004 | Parker | |
| 6,888,097 B2 | 5/2005 | Batarseh et al. | |
| 8,464,794 B2 | 6/2013 | Schultz et al. | |
| 8,936,108 B2 | 1/2015 | Zediker et al. | |
| 9,399,269 B1 | 7/2016 | Zediker et al. | |
| 9,932,803 B2 | 4/2018 | Batarseh et al. | |
| 10,822,879 B2 | 11/2020 | Batarseh | |
| 10,968,736 B2 | 4/2021 | Batarseh | |
| 11,248,426 B2 | 2/2022 | Batarseh et al. | |
| 11,761,265 B2 | 9/2023 | Faircloth et al. | |
| 2010/0326659 A1 | 12/2010 | Schultz et al. | |
| 2014/0345861 A1 | 11/2014 | Stalder et al. | |
| 2015/0198022 A1 | 7/2015 | Stanecki et al. | |
| 2016/0362968 A1* | 12/2016 | Kriesels | E21B 43/108 |
| 2019/0345812 A1* | 11/2019 | Aljubran | E21B 47/007 |
| 2021/0164294 A1* | 6/2021 | Batarseh | E21B 41/0078 |
| 2023/0407724 A1* | 12/2023 | Batarseh | E21B 27/02 |

FOREIGN PATENT DOCUMENTS

| | | |
|---|---|---|
| CN | 203081295 | 7/2013 |
| CN | 203334954 | 12/2013 |
| EP | 2631999 | 8/2013 |

* cited by examiner

*Primary Examiner* — Matthew Troutman
*Assistant Examiner* — Patrick F Lambe
(74) *Attorney, Agent, or Firm* — Fish & Richardson P.C.

(57) ABSTRACT

A downhole tool for repairing a tubular disposed in a wellbore includes a main body assembly configured to be positioned within the tubular, a cladding feed assembly configured to dispose a cladding material on an interior surface of the tubular, and a laser head assembly configured to direct a laser beam towards the cladding material disposed on the interior surface to thereby weld at least a portion of the cladding material to the interior surface the laser head assembly further configured to selectively adjust an area of the laser beam incident on the cladding material disposed on the interior surface of the tubular.

14 Claims, 8 Drawing Sheets

LASER CLADDING DOWNHOLE REPAIR

TECHNICAL FIELD

The present disclosure relates to subterranean wells, and more specifically, to removing objects from a subterranean well.

BACKGROUND

In subsurface well drilling, completion, and production operations, it is not uncommon for a tubular or other downhole component disposed within a wellbore to have or develop defects such as holes or gaps due to erosion, corrosion, or other factors. It may be desirable or necessary to repair such defects while the component remains within the wellbore.

SUMMARY

Certain aspects of the subject matter herein can be implemented as a downhole tool for repairing a tubular disposed in a wellbore. The tool includes a main body assembly configured to be positioned within the tubular, a cladding feed assembly configured to dispose a cladding material on an interior surface of the tubular, and a laser head assembly configured to direct a laser beam towards the cladding material disposed on the interior surface to thereby weld at least a portion of the cladding material to the interior surface the laser head assembly further configured to selectively adjust an area of the laser beam incident on the cladding material disposed on the interior surface of the tubular.

Certain aspects of the subject matter herein can be implemented as a system for repairing a tubular disposed in a wellbore, The system includes a downhole repair tool and a conveyance. The downhole repair tool includes a main body assembly configured to be positioned within the tubular, a cladding feed assembly configured to dispose a cladding material on an interior surface of the tubular, and a laser head assembly configured to direct a laser beam towards the cladding material disposed on the interior surface to thereby weld at least a portion of the cladding material to the interior surface, the laser head assembly further configured to selectively adjust the area of the laser beam incident on the cladding material disposed on the interior surface of the tubular. The conveyance is configured to lower the repair tool downhole to a position proximate an area of the tubular to be repaired.

Certain aspects of the subject matter herein can be implemented as a method for repairing a tubular disposed in a wellbore. The method includes lowering, by a conveyance assembly, a downhole repair tool within the tubular. The downhole repair tool includes a main body assembly configured to be positioned within the tubular, a cladding feed assembly configured to dispose a cladding material on an interior surface of the tubular, and a laser head assembly. The method further includes disposing from the cladding feed assembly the cladding material onto the interior surface of the tubular. The method further includes transmitting, as a first instance of laser beam transmittal with the laser head assembly in a first adjustment state, a laser beam from the laser head assembly onto the cladding material, thereby welding at least a first portion of the cladding material in the area to the interior surface of the tubular, and transmitting, as a second instance of laser beam transmittal with the laser head assembly in a second adjustment state, the laser beam from the laser beam assembly onto the cladding material, thereby welding at least a second portion of the cladding material in the area to the interior surface of the tubular, wherein, in the second adjustment state, an area of the laser beam incident on the cladding material is larger than in the first adjustment state.

DETAILED DESCRIPTION

In laser cladding, a laser beam is directly aimed at a cladding material (such as a cladding wire) disposed on surface. The heat generated by the beam melts and welds the cladding material to the surface. In some embodiments, a cladding tool or system can be configured such that a wire is disposed on the surface by a wire feeding system and the laser head subsequently travels along the wire, forming a continuous weld along the length of the wire. In some embodiments, a tool or system can be configured such that additional cladding layers can be disposed on the surface and/or the welded cladding material and the process repeated until the surface is adequately covered and/or a weld of desired thickness or strength is formed. A wire feeding system can include an internal purging system to direct excess cool down and direct gas or other by-products of the melting process way from the laser head and the surface.

Repair of defects such as holes or gaps due to erosion, corrosion, or other factors can be technically challenging, expensive, and/or time consuming. In some embodiments of the present disclosure, a system, method, or apparatus includes or comprises a downhole tool for repairing a tubular disposed in a wellbore. The tool a main body assembly configured to be positioned within the tubular, a cladding feed assembly configured to dispose a cladding material on an interior surface of the tubular, and a laser head assembly configured to direct a laser beam towards the cladding material disposed on the interior surface. The laser head assembly is configured to selectively adjust an area of the laser beam incident on the cladding material.

The resulting welded alloy provides a thin but strong repair over the defect, in some embodiments stronger than the native pipe, that is resistant to hydrogen sulfide and other corrosion. The repair can be precisely controlled, resulting in an even surface and cost-effective repair operations.

Figure 1:
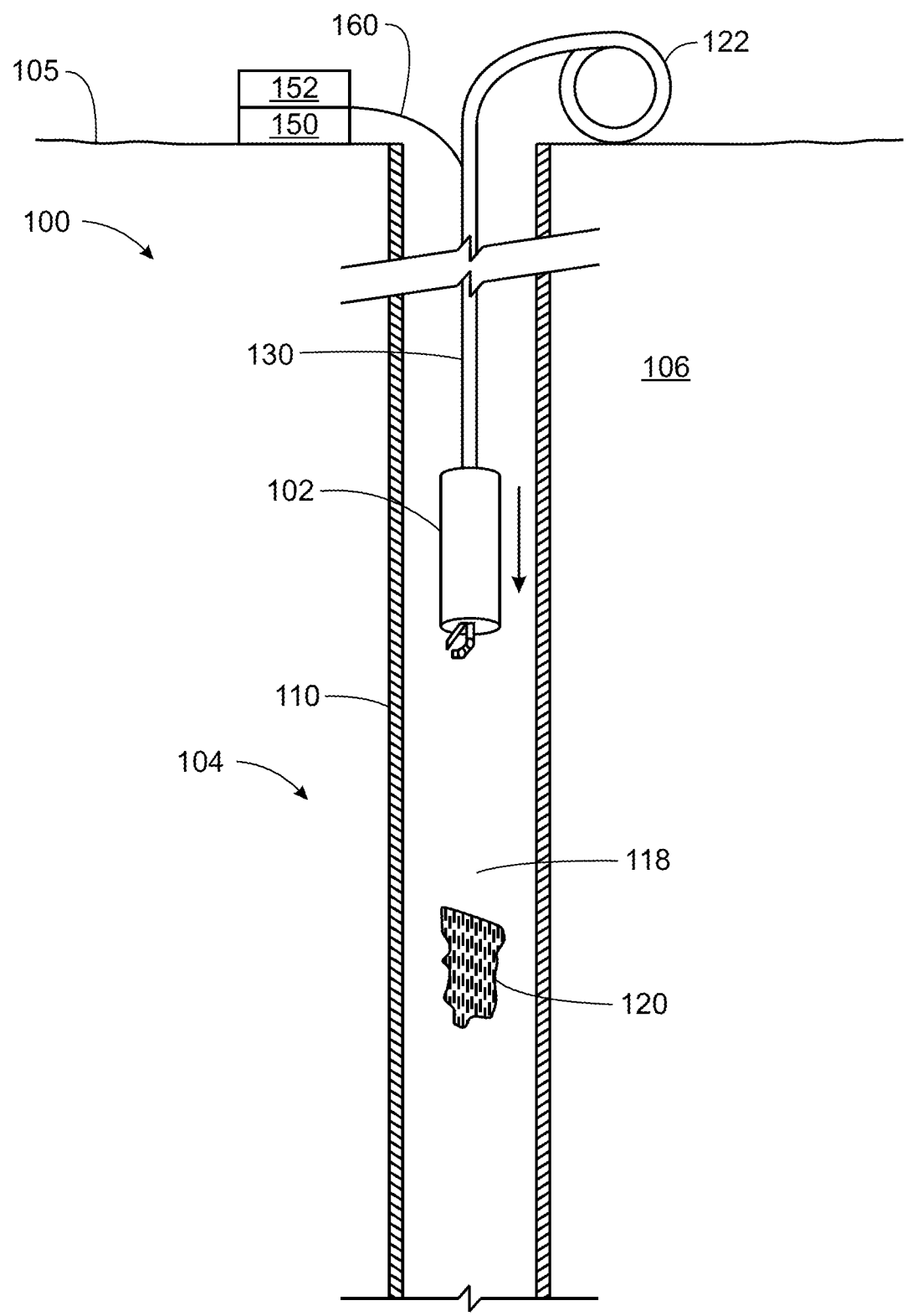
FIG. 1 is a schematic illustration of a system for repairing a tubular disposed in a wellbore, in accordance with an embodiment of the present disclosure.

FIG. 1 is a schematic illustration of a system 100 for repairing a tubular disposed in a wellbore in accordance with an embodiment of the present disclosure. The system includes a repair tool 102 disposed in a wellbore 104 drilled from a surface 105 into a subterranean zone 106. Within wellbore 104 is disposed a tubular 110 which can be a casing, production tubing string, or other downhole tubular or tubular assembly. Conveyance 130 can lower tool 102 in downhole direction within tubular 110 toward a defect zone 120 which can include an area of corrosion, erosion, or other damage, and can include a gap, crack, or area of thinning of the wall of tubular 110. Conveyance 130 can also raise tool 102 in an uphole direction. Conveyance 130 in the illustrated embodiment is coiled tubing supplied from a spool 122, but in other embodiments conveyance 130 could be wireline or other suitable conveyance such as a downhole tractor. Wellbore 104 is illustrated as a vertical well but can be a horizontal, lateral, or other well or well portion or well segment. Wellbore 104 can be uncased or partially or fully cased.

As described in further detail below, repair tool 102 includes a cladding feed assembly configured to dispose a cladding material on interior surface 118 of tubular 110 and a laser head assembly configured to direct a laser beam towards the cladding material, such that the at least a portion of the cladding material is welded to the interior surface. In this way, the cladding material serves to place welded cladding material on and proximate to the defect zone so as to at least partially repair it. Also as described in further details below, the laser head assembly can be configured to selectively adjust an area of the laser beam incident on the cladding material disposed on the interior surface of the tubular System 100 can further include a laser source module 150 which is configured to transmit laser light along optical fiber 160. Optical fiber 160 is connected to tool 102 and conveys the laser light to the laser head of the repair tool. In some embodiments, optical fiber 160 can be integrated as a component of conveyance 130. System 100 can further include a control module 152 that can receive and transmit data and control signals from and to the feed assembly, laser head, control mechanisms, sensors, and other components of the tool, via optical fiber 160 or another suitable wired or wireless connection. In some embodiments, laser source module 150 and control module 152 are positioned at a surface location. In some embodiments, some or all of the components of laser source module 150 or control module 152 can be positioned downhole. In some embodiments, the functions of source module 150 and control module 152 can be separate, or can be integrated into a combined laser source and control module.

Figure 2:
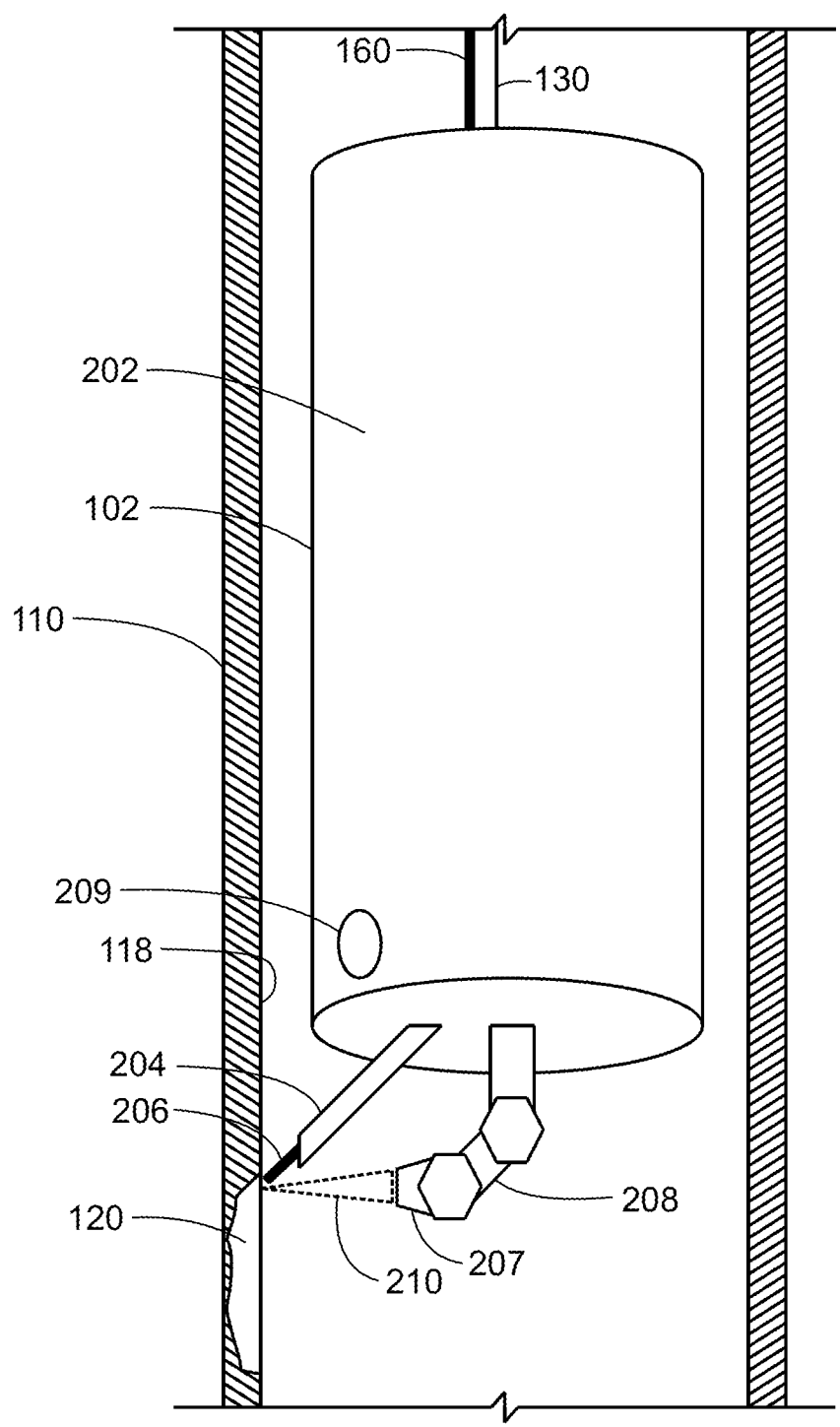
FIG. 2 is a schematic illustration of a downhole repair tool in accordance with an embodiment of the present disclosure.
Figure 3A:
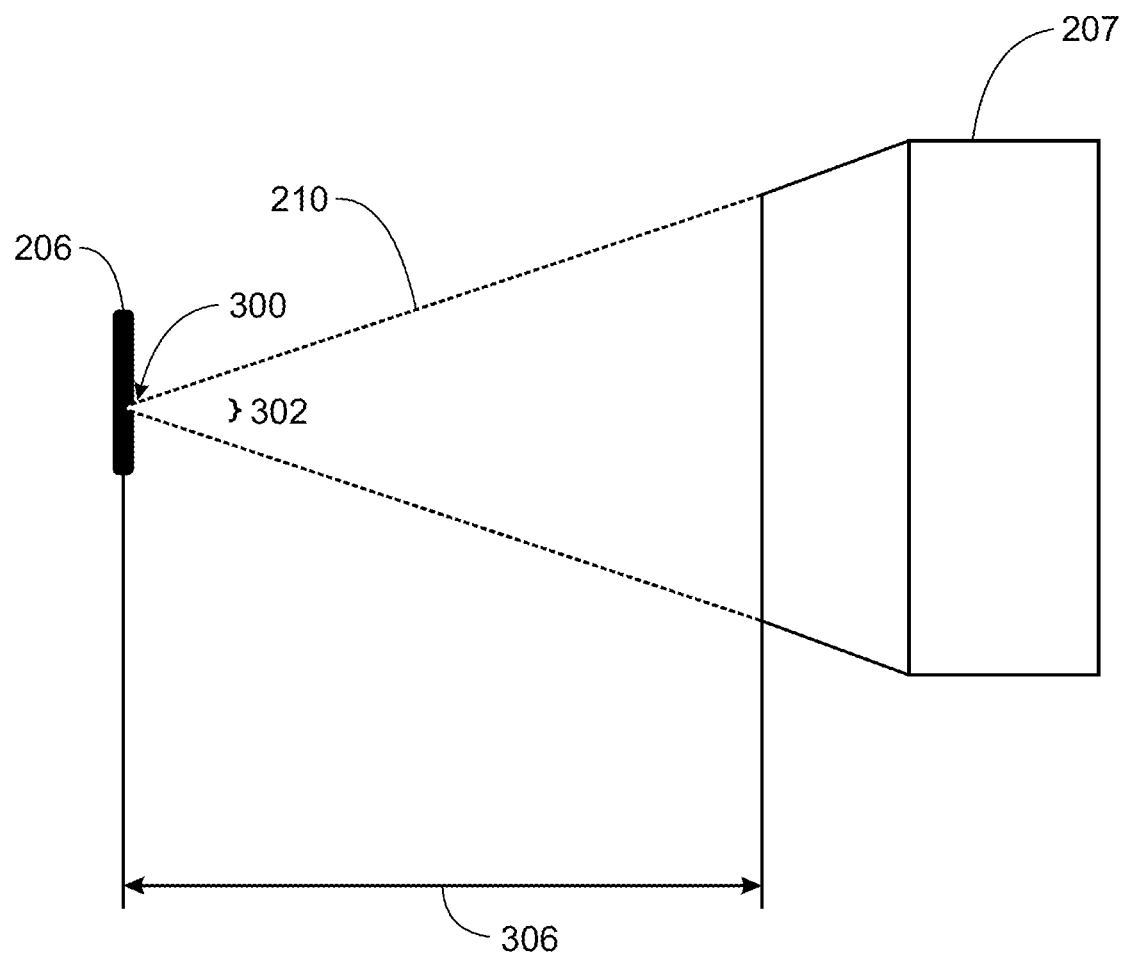
FIGS. 3A and 3B are a schematic illustrations of operations of an adjustable laser head in accordance with an embodiment of the present disclosure.
Figure 3B:
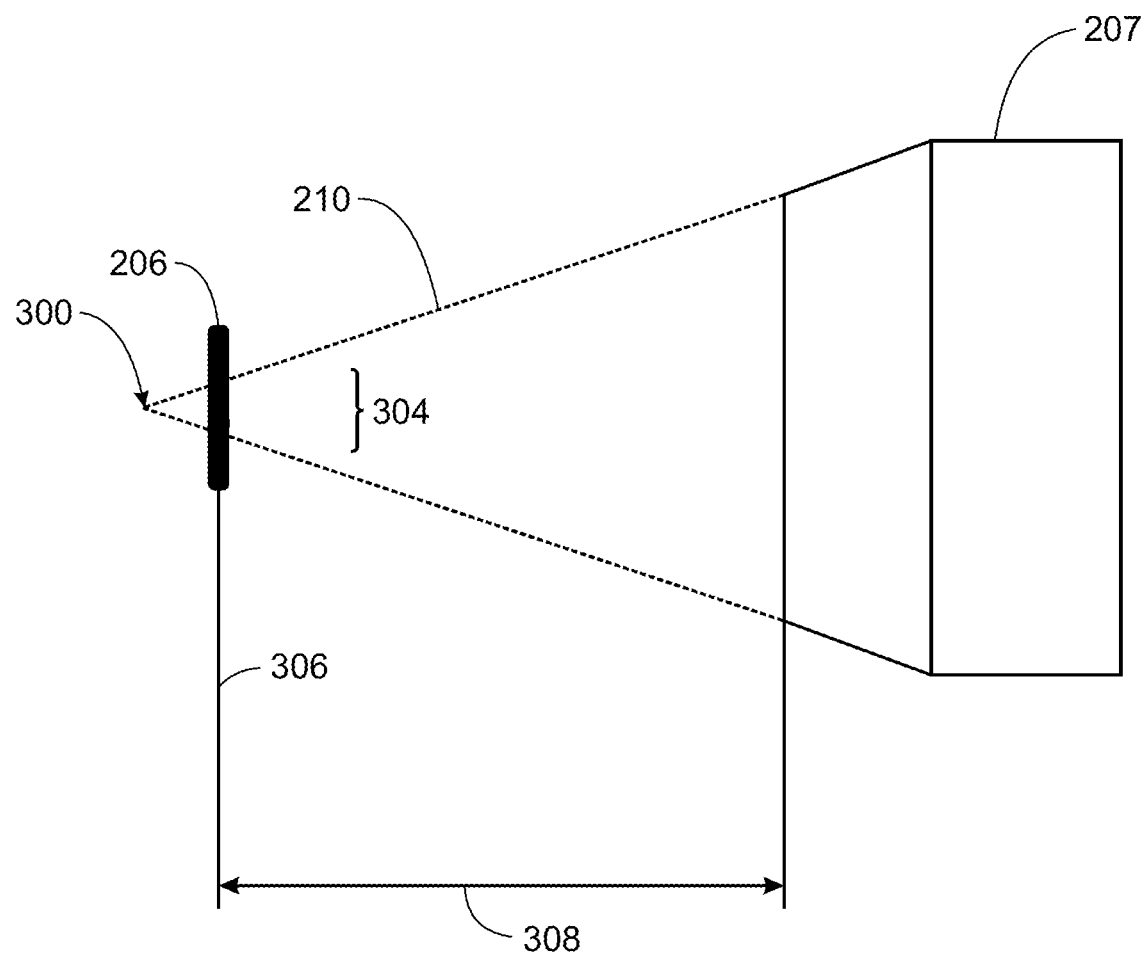

FIG. 2 is a schematic illustration showing further detail of laser cladding repair tool 102 in accordance with an embodiment of the present disclosure. Tool 102 includes a main body assembly 202, a cladding feed assembly 204 configured to dispose a cladding material 206 on interior surface 118 of tubular 110, and a laser head assembly 208 with a laser head 207 configured to direct a laser beam 210 towards the cladding material, so as to weld the cladding material to the interior surface.

In the illustrated embodiment, laser head assembly 208 can include one or more motors and articulated elements to enable selective positional adjustment of laser head 207 (that is, spatial adjustment of laser head 207 independent of the position of the tool itself). Such adjustment can change the position of the focal point of the laser relative to the cladding material onto which laser beam 210 is projected, while the tool itself—attached to the coiled tubing—can remain substantially motionless relative to the defect zone of the tubular. In this way, as described in further detail below, the location and size of the area of the laser beam incident on the cladding material disposed on the interior surface of the tubular can be adjusted during the welding process. Tool 102 can further include one or more sensors 209 which can include acoustic sensors, cameras, or other suitable sensors to determine the distance and position of the repair area 120 relative to tool 102 and to enable precise adjustment and positioning of laser head 207 relative to the repair area during laser welding operations.

The cladding material can be in the form of alloy wire such as Inconel 625, Inconel 825, Hastelloy C276, or another suitable material. Cladding feed assembly 204 can be a standard cladding wire feed mechanism or other suitable cladding material application apparatus. Laser head assembly 208 can include collimating lenses for a fixed-diameter beam or long focal-point lenses.

Figure 4A:
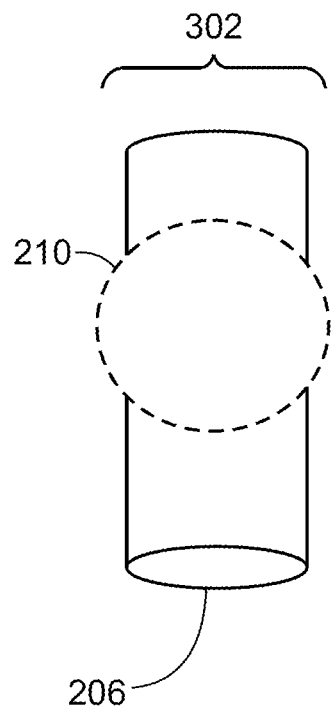
FIGS. 4A and 4B are schematic illustrations of area of the laser beam incident on the cladding material during operations of an adjustable laser cladding repair tool in accordance with an embodiment of the present disclosure.
Figure 4B:
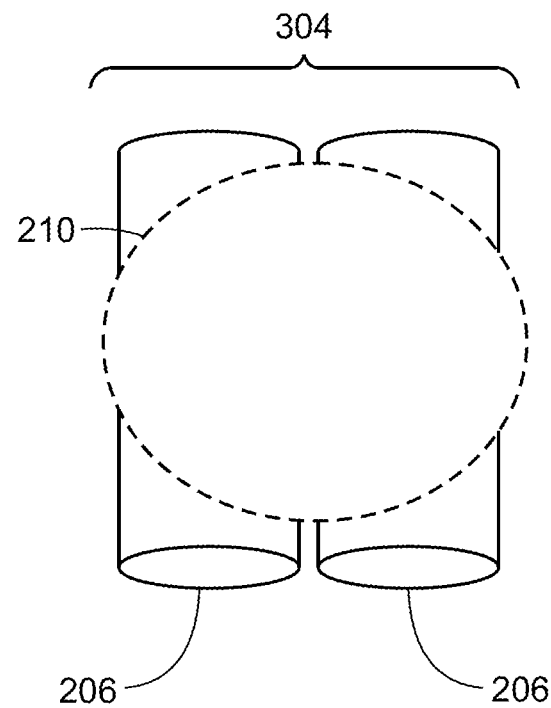

FIGS. 3A and 3B and 4A and 4B are schematic illustrations of operations of an adjustable laser head in accordance with an embodiment of the present disclosure, showing laser head 208 focusing a laser beam 210 onto strands of cladding wire 206. In a first adjustment state shown in FIGS. 3A and 4A, laser head 207 is positioned a distance 306 from cladding wire 206 such that the focal point 300 of laser beam 210 is at or near the surface of the cladding wire (as the wire lays on the repair area), thus covering a small area 302 which, as shown in FIG. 4A, is approximately the same width as the width of a single strand of cladding wire 206. In a second adjustment state shown in FIGS. 3B and 4B, laser head 207 is positioned a distance 308 from cladding wire 206 (that is, with distance 308 being lesser than distance 306), such that in FIGS. 3B and 4B the focal point 300 of laser beam 210 is behind the cladding material and laser beam 210, resulting in the laser beam being incident on the cladding material over an area 304 that is greater than the area 302. As shown in FIG. 4A (the first adjustment state), the width of area 302 (from the laser head in the first adjustment state) is approximately the width of a single strand of cladding wire 206. In contrast, in FIG. 4B (the second adjustment state), the width of area 304 is greater such that the beam can simultaneously weld a greater area of cladding material (for example, as illustrated, multiple strands of cladding wire 206).

Although for illustrative purposes two adjustment states are described above (a first adjustment state and a second adjustment state), it will be understood by those skilled in the art that, in some embodiments, an adjustable laser head may be adjustable into three, four, or more adjustment states comprising corresponding different head positions, providing an operator with three, four, or more focal point positions relative to the cladding material and corresponding ranges of beam incidence area sizes. In some embodiments, the adjustable head may be infinitely positionable and/or able to shift smoothly and continuously among various positions. One skilled in the art would understand therefore that references above and below to a first and second adjustment state do not mean that embodiments of the present disclosure are limited to only two such head positions or states. In some embodiments, the switch from an adjustment state to another adjustment state, resulting in a different sized incident area, can be by a means other than by a positional adjustment of the laser head (for example, by adjustment of a focus of variable-focus laser).

Figure 5:
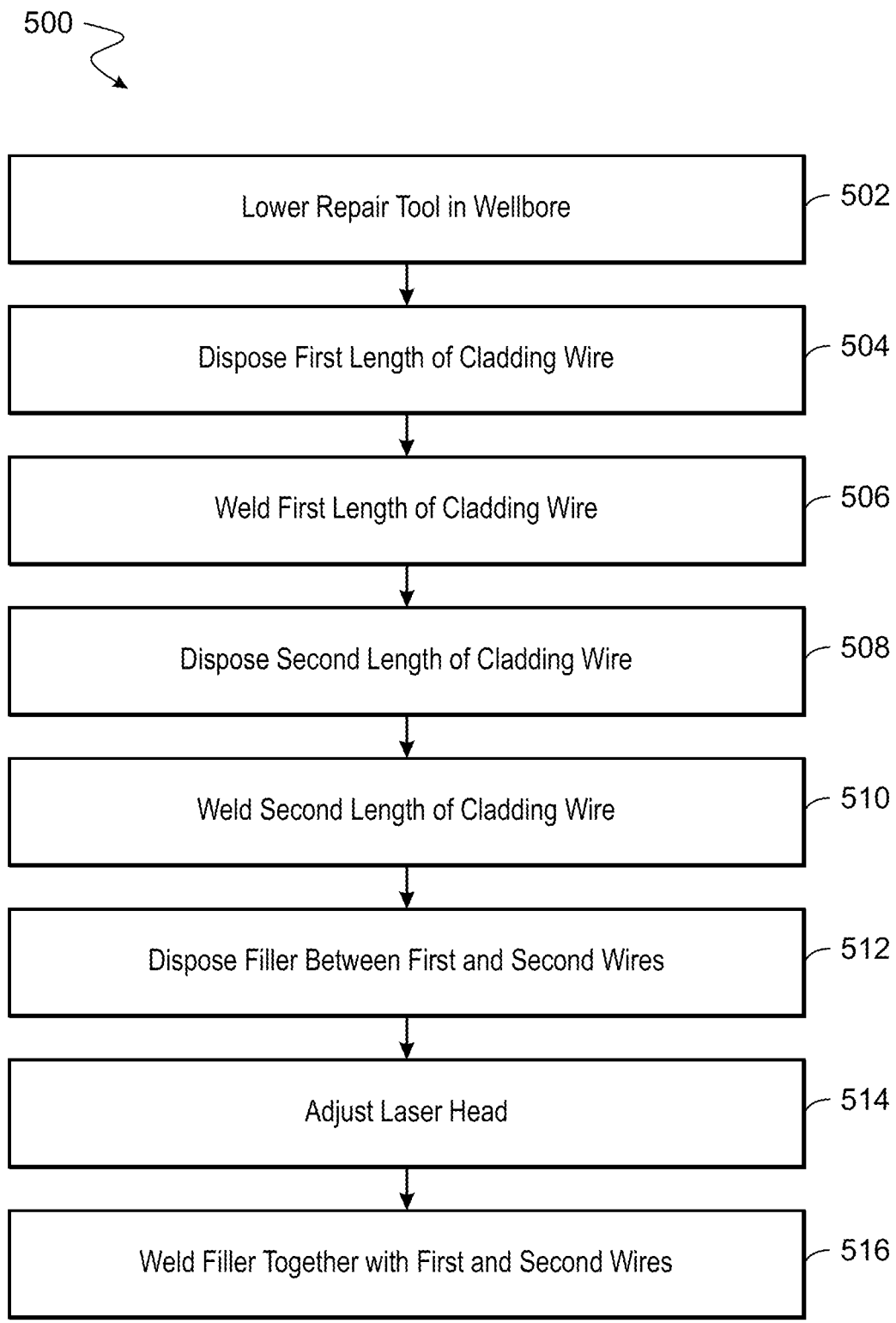
FIG. 5 process flow diagram of a method of operating a laser cladding fishing tool in accordance with an embodiment of the present disclosure.

FIG. 5 process flow diagram of a method of operating a laser cladding repair system in accordance with an embodiment of the present disclosure. The method of FIG. 5 is described in reference to the tool and system described in reference to the above figures; however, the method can be used with other suitable tools and systems.

Figure 6A:
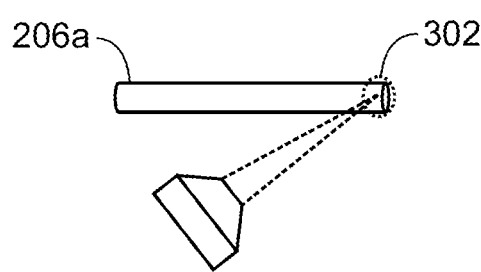
FIGS. 6A-6F are schematic illustrations of operations of a laser cladding fishing tool in accordance with an embodiment of the present disclosure.

The method begins with step 502 in which laser cladding repair tool is lowered by a conveyance downhole within wellbore to a defective zone to be repaired. At step 504, and as shown in FIG. 6A, a first strand 206a of cladding wire is disposed from the cladding feed assembly to the interior surface of the tubular. At step 506, as a first instance of laser beam transmittal, a laser beam is directed by the laser head assembly onto the first length cladding wire, thereby welding it to the interior surface. In this first instance of laser beam transmittal, the laser head assembly is in a first state and the area of the laser beam incident on the cladding wire is the size of area 302 (as shown in FIG. 4A).

Figure 6B:
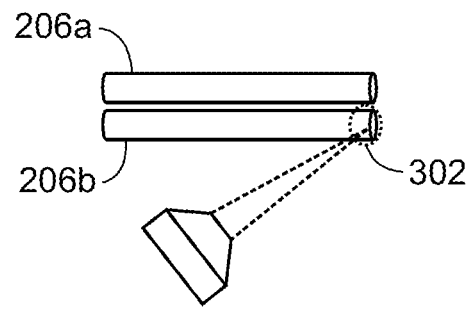

Proceeding to step 508, as shown in FIG. 6B, a second length 206b of cladding wire is disposed from the cladding feed assembly to the interior surface of the tubular proximate to (or in contact with), and in parallel with, the first length 206a of cladding wire. At step 510, as a second instance of laser beam transmittal, the laser beam is directed by the laser head assembly onto the second cladding wire, thereby welding it to the interior surface. Similar to the first instance of laser beam transmittal, the laser head assembly in step 506 is in the first adjustment state and the area of the laser beam incident on the cladding wire is the size of area 302 of FIG. 4A.

Figure 6C:
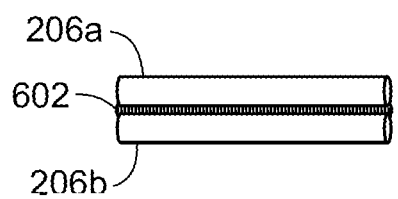
Figure 6D:
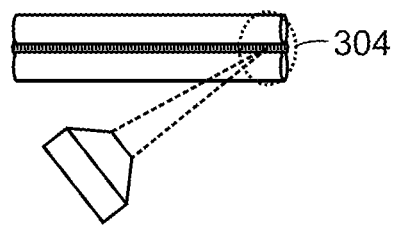
Figure 6E:
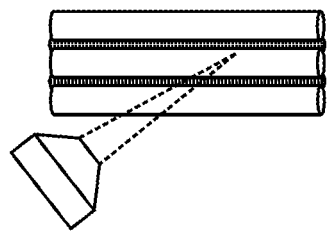
Figure 6F:
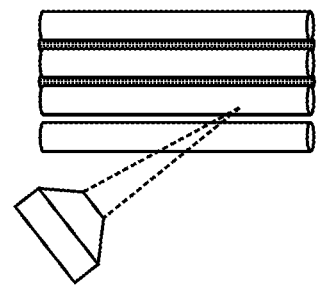

Proceeding to step 512, a cladding filler material (shown as 602 on FIG. 6C) (such as another strand of cladding wire) is disposed between (and in parallel with) the first strand of cladding wire and the second strand of cladding wire disposed on the interior surface. At step 512, the laser head is adjusted from the first state to the second state in which the focal point is adjusted such that the area of incidence of the laser beam (304) on the cladding material is larger than the area of incidence of the laser beam (302) in the first state. At step 514, as shown in FIG. 6D, the laser beam is directed by the laser head assembly as a third instance of laser beam transmittal, with the laser head assembly in the second adjustment state such that it has a sufficient incidence area 304 to cover the first and second cladding wires together with the filler material, thereby welding them together. As shown in FIGS. 6E and 6F, the process can be repeated with additional lengths of cladding wires with filler material disposed therebetween, forming a continuous area of welded cladding wire with filler material to cover a gap, corrosion area, or other defect in a casing or tubular.

Figure 7A:
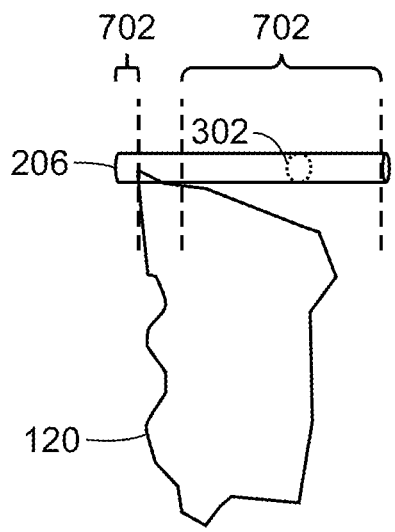
FIGS. 7A-7D are schematic illustrations of operations of a laser cladding fishing tool in accordance with an embodiment of the present disclosure.
Figure 7B:
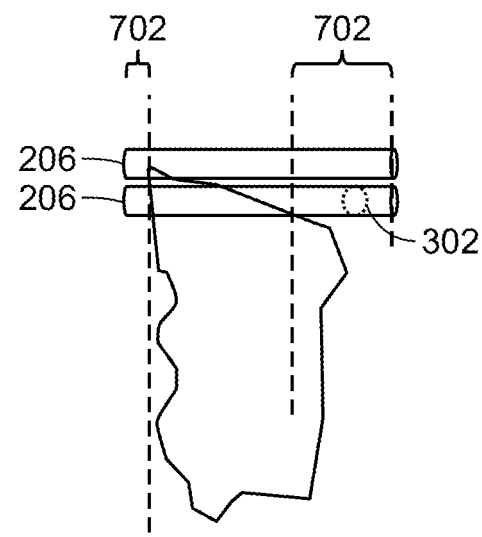
Figure 7C:
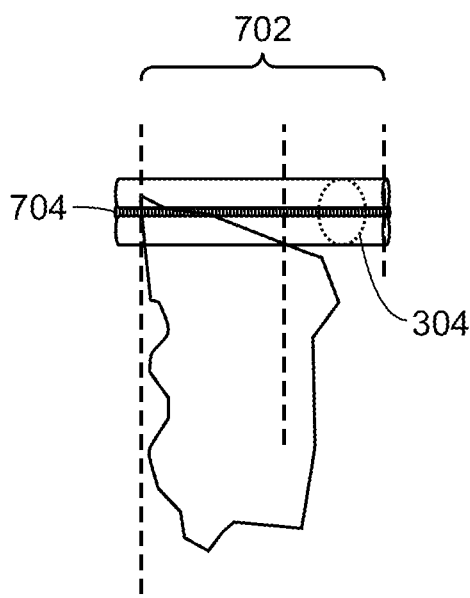
Figure 7D:
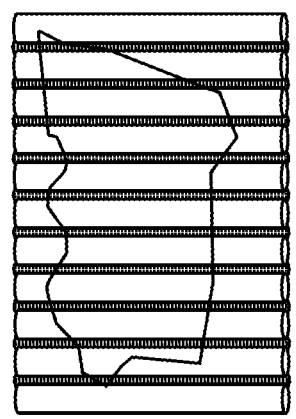

As shown in FIGS. 7A-7D, the use of filler material with adjusted laser beam focal point can enable effective coverage of a gap, corrosion, or other defect area for which continuous contact and welding of the cladding wire with the interior surface may be prevented due to the size or depth of the gap or corrosion area. As shown in FIG. 7A, a first length of cladding wire can be disposed on the interior surface, and the laser head in the first adjustment state such that the small laser beam incident area 302 (as described above in reference to FIG. 3A) is in contact with the cladding wire 206, but only along those zones 702 where the wire is actually in contact with the surface of the tubular (i.e., not in the defect area 120). As shown in FIG. 7B, a second length of cladding wire 206 can be disposed on the interior surface in parallel with the first length, with the welding zone 702 smaller in length because of the irregular size of the defect area. As shown in FIG. 7C, a filler material 704 can be disposed between the wires, and the laser head adjusted from the first adjustment state to the second adjustment state with a larger beam incident area 304 (as described above in reference to FIG. 3B) sufficient to cover at least a portion of both wires and also the filler material with a welding zone 702 encompassing the full length of the wires, thereby allowing a welding of the two wires and the filler material together across the defect area, notwithstanding the lack of actual contact of the wires with the interior surface. By repeating this process, a continuous area of welded cladding material can entirely cover the defect area, as shown in FIG. 7D.

The term "uphole" as used herein means in the direction along a wellbore from its distal end towards the surface, and "downhole" as used herein means the direction along a wellbore from the surface towards its distal end. A downhole location means a location along a wellbore downhole of the surface.

While this specification contains many specific implementation details, these should not be construed as limitations on the scope of any claims or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

A number of implementations have been described. Nevertheless, it will be understood that various modifications may be made without departing from the spirit and scope of the disclosure. For example, example operations, methods, or processes described herein may include more steps or fewer steps than those described. Further, the steps in such example operations, methods, or processes may be performed in different successions than that described or illustrated in the figures. Accordingly, other implementations are within the scope of the following claims.

EXAMPLES

In a first aspect, a downhole tool for repairing a tubular disposed in a wellbore includes a main body assembly configured to be positioned within the tubular, a cladding feed assembly configured to dispose a cladding material on an interior surface of the tubular, and a laser head assembly configured to direct a laser beam towards the cladding material disposed on the interior surface to thereby weld at least a portion of the cladding material to the interior surface the laser head assembly further configured to selectively adjust an area of the laser beam incident on the cladding material disposed on the interior surface of the tubular.

In a second aspect according to the first aspect, selectively adjusting an area of the laser beam incident on the cladding material includes selectively adjusting the distance between the laser head and the cladding material.

In a third aspect in accordance with the first or the second aspect, the laser head assembly is configured to direct the laser beam radially outward with respect to a central axis of the tool.

In a fourth aspect in accordance with the third aspect, a directing of the laser beam radially outward with respect to the central axis of the tubular comprises directing the laser beam substantially perpendicular to the central axis.

In a fifth aspect in accordance with any of the first to the fourth aspects, the laser head assembly is configured to be selectively switched between a first state in which directing the laser beam towards the cladding material comprises directing the laser beam such that a focal point is of the laser beam is on or near a surface of the cladding material, and a second state in which directing the laser beam towards the cladding material comprises directing the laser beam such that a focal point of the laser beam is behind the cladding material.

In a sixth aspect in accordance with any of the first to the fifth aspects, the tool further includes sensors configured to sense physical parameters indicative of the location and orientation of the tool in relation a repair area of the tubular.

In a seventh aspect, a system for repairing a tubular disposed in a wellbore includes a downhole repair tool and a conveyance. The downhole repair tool includes a main body assembly configured to be positioned within the tubular, a cladding feed assembly configured to dispose a cladding material on an interior surface of the tubular, and a laser head assembly configured to direct a laser beam towards the cladding material disposed on the interior surface to thereby weld at least a portion of the cladding material to the interior surface, the laser head assembly further configured to selectively adjust the area of the laser beam incident on the cladding material disposed on the interior surface of the tubular. The conveyance is configured to lower the repair tool downhole to a position proximate an area of the tubular to be repaired.

In an eighth aspect in accordance with the seventh aspect, the conveyance assembly comprises an optical fiber configured to convey laser light to the laser head assembly.

In a ninth aspect in accordance with the seventh or the eighth aspect, selectively adjusting an area of the laser beam incident on the cladding material includes selectively adjusting the distance between the laser head and the cladding material.

In a tenth aspect in accordance with any of the seventh aspect to the ninth aspect, the laser head assembly is configured to direct the laser beam radially outward with respect to a central axis of the tool.

In an eleventh aspect in accordance with the tenth aspect, a directing of the laser beam radially outward with respect to the central axis of the tubular includes directing the laser beam substantially perpendicular to the central axis.

In a twelfth aspect in accordance with any of the seventh aspect to the eleventh aspect, the laser head assembly is configured to be selectively switched between a first state in which directing the laser beam towards the cladding material comprises directing the laser beam such that a focal point is of the laser beam is on or near a surface of the cladding material, and a second state in which directing the laser beam towards the cladding material comprises directing the laser beam such that a focal point of the laser beam is behind the cladding material.

In a thirteenth aspect in accordance with any of the seventh aspect to the twelfth aspect, the tool further includes sensors configured to sense physical parameters indicative of the location and orientation of the tool in relation a repair area of the tubular.

In a fourteenth aspect, a method for repairing a tubular disposed in a wellbore includes lowering, by a conveyance assembly, a downhole repair tool within the tubular. The downhole repair tool includes a main body assembly configured to be positioned within the tubular, a cladding feed assembly configured to dispose a cladding material on an interior surface of the tubular, and a laser head assembly. The method further includes disposing from the cladding feed assembly the cladding material onto the interior surface of the tubular. The method further includes transmitting, as a first instance of laser beam transmittal with the laser head assembly in a first adjustment state, a laser beam from the laser head assembly onto the cladding material, thereby welding at least a first portion of the cladding material in the area to the interior surface of the tubular, and transmitting, as a second instance of laser beam transmittal with the laser head assembly in a second adjustment state, the laser beam from the laser beam assembly onto the cladding material, thereby welding at least a second portion of the cladding material in the area to the interior surface of the tubular, wherein, in the second adjustment state, an area of the laser beam incident on the cladding material is larger than in the first adjustment state.

In a fifteenth aspect in accordance with the fourteenth aspect, the conveyance assembly includes an optical fiber configured to convey laser light to the laser head assembly.

In a sixteenth aspect in accordance with the fourteenth or fifteenth aspect, a transitioning from the first adjustment state to the second adjustment state comprises adjusting a distance between the laser head and the cladding material.

In a seventeenth aspect in accordance with any of the fourteenth to the sixteenth aspect, a transitioning from the first adjustment state to the second adjustment state comprises adjusting the laser head so as to change a relative position of a focal point of the laser beam relative to the cladding material.

In an eighteenth aspect in accordance with any of the fourteenth to seventeenth aspects, the laser head assembly is configured to direct the laser beam radially outward with respect to a central axis of the tool.

In a nineteenth aspect in accordance with the eighteenth aspect, a directing of the laser beam radially outward with respect to the central axis of the tubular includes directing the laser beam substantially perpendicular to the central axis.

In a twentieth aspect in accordance with any of the fourteenth aspect to the nineteenth aspect, the method also includes determining, by sensors on board the tool, physical parameters indicative of the location and orientation of the tool in relation a repair area of the tubular.

What is claimed is:

1. A downhole tool for repairing a tubular disposed in a wellbore, the tool comprising:
   a main body assembly configured to be positioned within the tubular;
   a cladding feed assembly configured to dispose a cladding material at a defect area on an interior surface of the tubular; and
   a laser head assembly comprising a laser head configured to direct a laser beam radially outward with respect to a central axis of the tool towards the defect area to thereby weld at least a portion of the cladding material to the interior surface of the defect area, the laser head assembly articulated to positionally adjust the laser head radially with respect to the central axis independently of the position of the tool to thereby adjust the distance between the laser head and the defect area while the tool and the laser head otherwise remain substantially motionless relative to the defect area, thereby selectively adjusting an area of incidence of the laser beam on the cladding material at the defect area.

2. The downhole tool of claim 1, wherein a directing of the laser beam radially outward with respect to the central axis of the tubular comprises directing the laser beam substantially perpendicular to the central axis.

3. The downhole tool of claim 1, wherein the laser head assembly is configured to be selectively switched between:
a first state in which directing the laser beam towards the defect area comprises directing the laser beam such that a focal point is of the laser beam is on or near a surface of the cladding material; and
a second state in which directing the laser beam towards the defect area comprises directing the laser beam such that a focal point of the laser beam is behind the cladding material.

4. The downhole tool of claim 1, further comprising sensors configured to sense physical parameters indicative of the location and orientation of the tool in relation to the defect area.

5. A system for repairing a tubular disposed in a wellbore, the system comprising:
a downhole repair tool comprising:
a main body assembly configured to be positioned within the tubular;
a cladding feed assembly configured to dispose a cladding material on an interior surface of the tubular; and
a laser head assembly comprising a laser head configured to direct a laser beam radially outward with respect to a central axis of the tool towards the defect area to thereby weld at least a portion of the cladding material to the interior surface at the defect area, the laser head assembly articulated to positionally adjust the laser head radially with respect to the central axis independently of the position of the tool to thereby adjust the distance between the laser head and the defect area while the tool and the laser head otherwise remain substantially motionless relative to the defect area, thereby selectively adjusting the area of incidence of the laser beam on the cladding material at the defect area; and
a conveyance configured to lower the repair tool downhole to a position proximate the defect area.

6. The system of claim 5, wherein the conveyance assembly comprises an optical fiber configured to convey laser light to the laser head assembly.

7. The system of claim 5, wherein a directing of the laser beam radially outward with respect to the central axis of the tubular comprises directing the laser beam substantially perpendicular to the central axis.

8. The system of claim 5, wherein the laser head assembly is configured to be selectively switched between:
a first state in which directing the laser beam towards the cladding material comprises directing the laser beam such that a focal point is of the laser beam is on or near a surface of the cladding material; and
a second state in which directing the laser beam towards the cladding material comprises directing the laser beam such that a focal point of the laser beam is behind the cladding material.

9. The system of claim 5, wherein the tool further comprises sensors configured to sense physical parameters indicative of the location and orientation of the tool in relation a repair area of the tubular.

10. A method for repairing a tubular disposed in a wellbore, the method comprising:
lowering, by a conveyance assembly, a downhole repair tool within the tubular to a defect area on an interior surface of the tubular, the downhole repair tool comprising:
a main body assembly configured to be positioned within the tubular;
a cladding feed assembly configured to dispose a cladding material at the defect area; and
a laser head assembly comprising a laser head configured to direct a laser beam radially outward with respect to a central axis of the tool and articulated to positionally adjust the laser head radially with respect to the central axis independently of the position of the tool;
disposing from the cladding feed assembly the cladding material onto the defect area;
transmitting, as a first instance of laser beam transmittal with the laser head assembly in a first adjustment state, a laser beam from the laser head assembly onto the cladding material at the defect area, thereby welding at least a first portion of the cladding material in the defect area; and
positionally adjusting the laser head radially with respect to the central axis independently of the position of the tool to a second adjustment state, thereby adjusting the distance between the laser head and the defect area while the tool and the laser head otherwise remain substantially motionless relative to the defect area;
transmitting, as a second instance of laser beam transmittal with the laser head assembly in the second adjustment state, the laser beam from the laser beam assembly onto the cladding material, thereby welding at least a second portion of the cladding material in the area to the interior surface of the tubular, wherein, in the second adjustment state, an area of incidence of the laser beam incident on the cladding material at the defect area is larger than in the first adjustment state.

11. The method of claim 10, wherein the conveyance assembly comprises an optical fiber configured to convey laser light to the laser head assembly.

12. The method of claim 10, wherein a transitioning from the first adjustment state to the second adjustment state comprises adjusting the laser head so as to change a relative position of a focal point of the laser beam relative to the defect area.

13. The method of claim 10, wherein a directing of the laser beam radially outward with respect to the central axis of the tubular comprises directing the laser beam substantially perpendicular to the central axis.

14. The method of claim 10, further comprising determining, by sensors on board the tool, physical parameters indicative of the location and orientation of the tool in relation to the defect area.

* * * * *